(12) United States Patent
Alicherry

(10) Patent No.: US 9,317,336 B2
(45) Date of Patent: Apr. 19, 2016

(54) METHOD AND APPARATUS FOR ASSIGNMENT OF VIRTUAL RESOURCES WITHIN A CLOUD ENVIRONMENT

(75) Inventor: Mansoor A. Alicherry, Scotch Plains, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 522 days.

(21) Appl. No.: 13/191,599

(22) Filed: Jul. 27, 2011

(65) Prior Publication Data

US 2013/0031559 A1 Jan. 31, 2013

(51) Int. Cl.
*G06F 9/455* (2006.01)
*G06F 9/50* (2006.01)

(52) U.S. Cl.
CPC ............ *G06F 9/5066* (2013.01); *G06F 9/5077* (2013.01)

(58) Field of Classification Search
None
See application file for complete search history.

(56) References Cited

U.S. PATENT DOCUMENTS

| 2009/0138883 A1* | 5/2009 | McLean .................. 718/104 |
| 2010/0131948 A1* | 5/2010 | Ferris .................... 718/1 |
| 2011/0167421 A1* | 7/2011 | Soundararajan et al. ......... 718/1 |
| 2011/0282982 A1* | 11/2011 | Jain ................... 709/223 |
| 2012/0317249 A1* | 12/2012 | Salsburg et al. ............. 709/220 |

OTHER PUBLICATIONS

Deepal Jayasinghe, et al.: "Improving Performance and Availability of Services Hosted on IaaS Clouds with Structural Constraint-Aware Virtual Machine Placement", Services Computing (SCC), 2011 IEEE International Conference on, IEEE, Jul. 4, 2011, pp. 72-79, XP031964999, ISBN: 978-1-4577-0863-3.*

Notification of Transmittal of The International Search Report and The Written Opinion of The International Searching Authority, or The Declaration, mailed Sep. 25, 2012, in PCT/US2012/042864, Alcatel-Lucent USA Inc., Applicant, 12 pages.

Deepal Jayasinghe, et al.: "Improving Performance and Availability of Services Hosted on IaaS Clouds with Structural Constraint-Aware Virtual Machine Placement", Services Computing (SCC), 2011 IEEE International Conference on, IEEE, Jul. 4, 2011, pp. 72-79, XP031964999, ISBN: 978-1-4577-0863-3.

(Continued)

*Primary Examiner* — Dong Kim
(74) *Attorney, Agent, or Firm* — Tong, Rea, Bently & Kim, LLC

(57) ABSTRACT

A virtual resource assignment capability is disclosed. The virtual resource assignment capability is configured to support provisioning of virtual resources within a cloud environment. The provisioning of virtual resources within a cloud environment includes receiving a user virtual resource request requesting provisioning of virtual resources within the cloud environment, determining virtual resource assignment information specifying assignment of virtual resources within the cloud environment, and provisioning the virtual resources within the cloud environment using the virtual resource assignment information. The assignment of the requested virtual resources within the cloud environment includes assignment of the virtual resource to datacenters of the cloud environment in which the virtual resources will be hosted and, more specifically, to the physical resources within the datacenters of the cloud environment in which the virtual resources will be hosted. The virtual resources may include virtual processor resources, virtual memory resources, and the like. The physical resources may include processor resources, storage resources, and the like (e.g., physical resources of blade servers of racks of datacenters of the cloud environment).

20 Claims, 7 Drawing Sheets

(56) References Cited

OTHER PUBLICATIONS

Xiaoqiao Meng et al.: "Improving the Scalability of Data Center Networks with Traffic-aware Virtual Machine Placement", INFOCOM, 2010 Proceedings IEEE, IEEE, Piscataway, NJ, USA, Mar. 14, 2010, pp. 1-9, XP031674817, ISBN: 978-1-4244-5836-3.
Vincenzo D Cunsolo et al: "Volunteer Computing and Desktop Cloud: The Cloud@Home Paradigm," Network Computing and Applications, 2009. NCA 2009, Jul. 9, 2009, pp. 134-139, XP031500033, ISBN: 978-0-7695-3698-9.
Korean Office Action from corresponding application No. 2014-7002115, dated Apr. 8, 2015, pp. 1-7.
Japanese Office action from corresponding application No. 2014-522827, dated Apr. 14, 2015, pp. 1-6.
Hato, Kunio, "Proposal of Inter-Cloud System Architecture," Technical Research Report of Electronics, Information, and Communication Engineers, Japan, The Institute of Electronics, Information and Communication Engineers, Feb. 24, 2011, vol. 110, No. 449, pp. 151-156.
Hu, Bo, "Proposal of an Inter-Cloud Resource Assignment Algorithm," Technical Research Report of Electronics, Information and Communication Engineers, Japan, The Institute of Electronics, Information and Communication Engineers, Feb. 24, 2011, vol. 110, No. 449, pp. 157-162.

* cited by examiner

FindMinStar(G, v, s) Process

Input: G=(V,E,w,l): Complete graph with vertex weight and edge lengths
    v: Starting vertex
    s: Weight of the subgraph
Output: Subgraph G'=(V',E') of weight at least s formed by v and its closest neighbors. Also returns the diameter.

```
V' = {v}
size= w(v)
Let u1, u2,... be the vertices of G sorted in increasing order of
length to v. That is l(v, u_i) ≤ l(v, u_{i+1})
i=1
diameter = 0
while (size < s)
do
    V' = V' U {u_i}
    size = size + w(u_i)
    i=i+1
    diameter = max(diameter, {l(v', u_i}: for all v' in V' - {u_i}})
    E' = E' U {(v', u_i): for all v' in V' - {u_i}}
done if (i > n)
    Weight of G is less than s. Hence, no subgraph of size s exist
in G.
    Return NULL Return G'=(V',E') and diameter
```

MinDiameterGraph(G, s) Process

Input: G=(V,E,w,l): Complete graph with vertex weights, edge lengths
s: Weight of the subgraph
Output: Subgraph G'=(V',E') of weight at least s. Also returns the diameter.

```
mindiameter = ∞
For each vertex v in V
do
   G" = FindMinStar(G, v, s)
   if (diameter(G") < mindiameter)
   then
        mindiameter = diameter(G")
        G' = G"
   endif
done Return G' and mindiameter
```

420

FindMinHeightTree(T, r, s) Process

Input: T: Tree representation of the datacenter resource
r: Root of the subtree where search is started
s: Required weight of the subtree
Output: Root of the subtree with weight at least s that has minimum height.
Also computes weight and height of the current subtree.

```
if ( r is a leaf node)
then
        height(r) = 1
        if (weight(r) ≥ s)
                return r
        else
                return NULL
endif height = 0
weight = 0
minheight = ∞
mintree = NULL
for each vertex v in children(r)
do
   n = FindMinHeightTree(T, v, s)
   if (n != NULL && minheight < height(n))
       minheight = height(n)
       mintree = n
   if (height(v) > height)
       height = height(v)
   weight = weight + weight(v)
done height(r) = height + 1;
weight(r) = weight;

if ( mintree = NULL && weight >= s)
        return r
else
        return mintree Return G' and mindiameter
```

FIG. 5

METHOD AND APPARATUS FOR ASSIGNMENT OF VIRTUAL RESOURCES WITHIN A CLOUD ENVIRONMENT

TECHNICAL FIELD

The invention relates generally to assignment of virtual resources and, more specifically but not exclusively, to assignment of virtual resources within cloud environments.

BACKGROUND

The use of cloud computing via a cloud environment continues to grow in popularity. The cloud environment includes physical resources which are used to host virtual resources for cloud computing users. In response to a virtual resource request from a cloud computing user, the requested virtual resources are provisioned on the physical resources of the cloud environment (e.g., one or more servers located in one or more datacenters) for use by the user in cloud computing.

SUMMARY

Various deficiencies in the prior art are addressed by embodiments for assigning virtual resources within a cloud environment.

In one embodiment, an apparatus includes a processor and a memory, where the processor is configured to receive a request for virtual resources where the request includes an amount of virtual resources requested and one or more virtual resource assignment constraints, receive management information associated with the cloud environment, and determine assignment of the requested virtual resources within the cloud environment using the amount of virtual resources requested, the one or more virtual resource assignment constraints, and the management information.

In one embodiment, a computer-readable storage medium stores instructions which, when executed by a computer, cause the computer to perform a method including receiving a request for virtual resources where the request includes an amount of virtual resources requested and one or more virtual resource assignment constraints, receiving management information associated with the cloud environment, and determining assignment of the requested virtual resources within the cloud environment using the amount of virtual resources requested, the one or more virtual resource assignment constraints, and the management information.

In one embodiment, a method includes using a processor and a memory for receiving a request for virtual resources where the request includes an amount of virtual resources requested and one or more virtual resource assignment constraints, receiving management information associated with the cloud environment, and determining assignment of the requested virtual resources within the cloud environment using the amount of virtual resources requested, the one or more virtual resource assignment constraints, and the management information.

BRIEF DESCRIPTION OF THE DRAWINGS

The teachings herein can be readily understood by considering the following detailed description in conjunction with the accompanying drawings, in which:

FIGS. 4A and 4B depict processes configured to determine a set of datacenters to which VMs are to be assigned;

FIG. 5 depicts a process configured to the racks, blades, and CPUs to which VMs are to be assigned.

To facilitate understanding, identical reference numerals have been used, where possible, to designate identical elements that are common to the figures.

DETAILED DESCRIPTION

Figure 1:
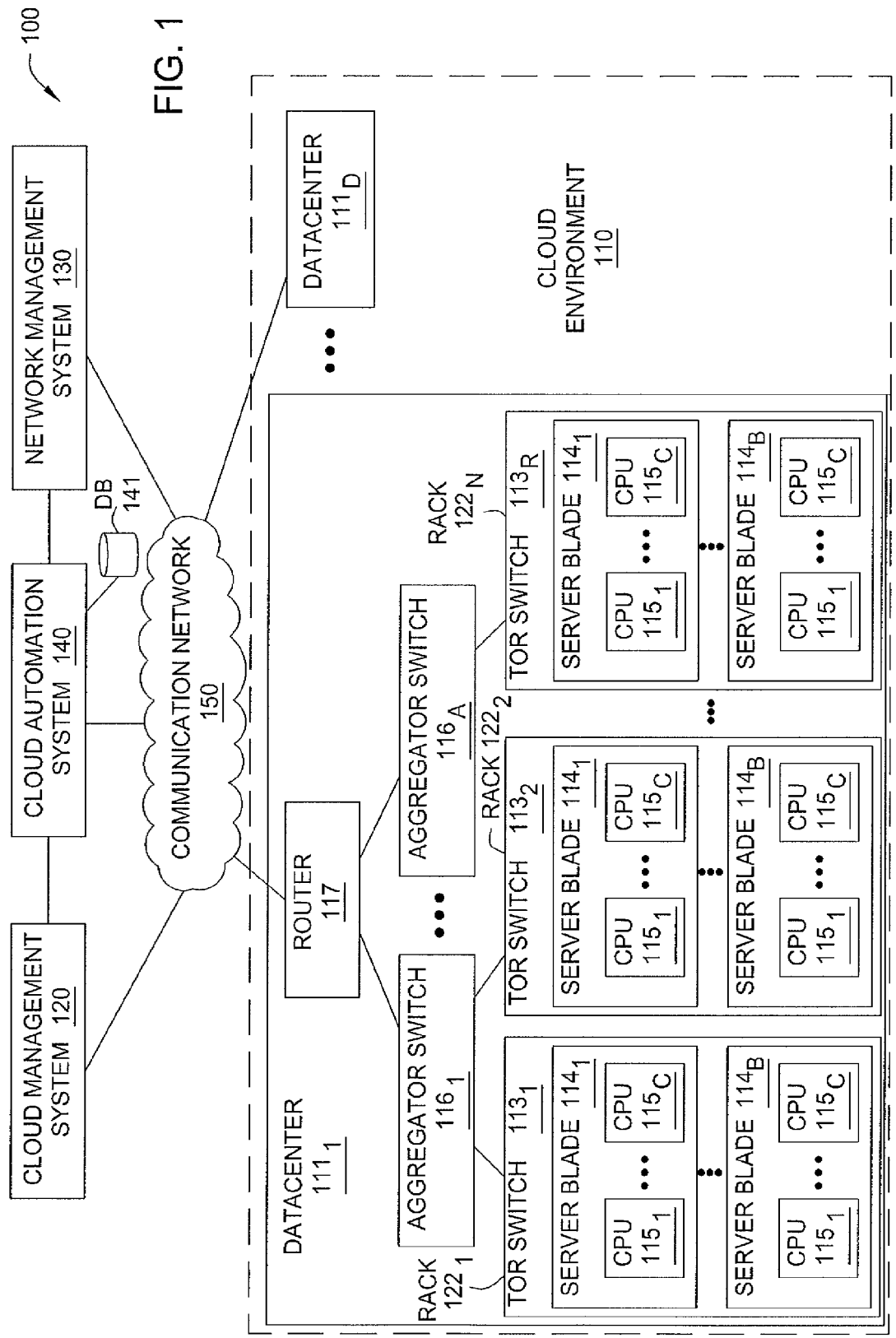
FIG. 1 depicts one embodiment of system configured to support automated assignment of VMs to physical resources of a cloud environment.

In general, a virtual resource assignment capability is depicted and described herein, although various other capabilities also may be presented herein.

In at least some embodiments, the virtual resource assignment capability provides automated assignment of virtual resources to physical resources in a cloud environment. The virtual resources may include virtual computing resources, virtual storage resource, and the like, as well as various combinations thereof. The physical resources may include processor resources (e.g., central processor units (CPUs) of blade servers of racks of datacenters), storage resources, and the like.

In at least some embodiments, the virtual resource assignment capability provides automated assignment of virtual resources to physical resources in a cloud environment in response to a user request for virtual resources. In at least some embodiments, a user request for virtual resources is received, assignment of virtual resources to physical resources of the cloud environment is determined, and the virtual resources are provisioned within the cloud environment based on the assignment of the virtual resources to the physical resources of the cloud environment. The user request for virtual resources may include virtual resource request information (e.g., amount of virtual resources requested, virtual resource assignment constraints, and the like), which may be used as an input for determining assignment of virtual resources to physical resources of the cloud environment. The determined assignment of virtual resources to physical resources of the cloud environment may be specified using virtual resource assignment information (e.g., selection of datacenters in which the requested virtual resources are placed, selection of equipment within the datacenters on which the requested virtual resources are placed, and the like). It is noted that various other types of information (e.g., network topology and/or status information associated with connectivity between datacenters, datacenter topology and/or status information, and the like) may be used for determining assignment of virtual resources to physical resources of the cloud environment. It is noted that various other types of information (e.g., selection of racks/blade servers/CPUs on which virtual resources are to be hosted, mapping of specific virtual resources to specific racks/blade servers/CPUs on which virtual resources are to be hosted, and the like) may be used to specify the assignment of the virtual resources to physical resources of the cloud environment.

In at least some embodiments, the virtual resource assignment capability provides automated assignment of virtual resources to physical resources in a cloud environment in a manner tending to improve the performance of the cloud environment (e.g., improving utilization of network resources) and in a manner tending to improve the performance of the user application(s) using the virtual resources (e.g., reducing communication delays, improving resiliency, and the like).

Although primarily depicted and described herein within the context of embodiments in which the virtual resources are virtual machines (VMs) and the physical resources are processors of blade servers, it is noted that the virtual resource assignment capability may be used to determine assignment of various other types of virtual resources and/or to determine assignment to various other types of physical resources.

FIG. 1 depicts one embodiment of system configured to support automated assignment of VMs to physical resources of a cloud environment.

The system 100 includes a cloud environment 110, a Cloud Management System (CMS) 120, a Network Management System (NMS) 130, a Cloud Automation System (CAS) 140, and a communication network (CN) 150.

The cloud environment 110 includes physical resources configured to host virtual resources. The physical resources may include servers and other types of physical resources configured to host virtual resources. The virtual resources may include virtual machines (VMs), virtual storage (VS), and the like, as well as various combinations thereof.

The cloud environment 110 includes a plurality of datacenters $111_1$-$111_D$ (collectively, datacenters 111).

The datacenters 111 include datacenter resources (e.g., computing resources, communication resources, and the like). The datacenters 111 are configured to communicate via communication network 150 and, thus, are capable of communicating with each other. The datacenters 111 may be geographically distributed.

The datacenters 111 each include physical resources configured to host virtual resources. Each datacenter 111 includes a plurality of racks $112_1$-$112_R$ (collectively, racks 112). Each rack 112 includes a plurality of blade servers $114_1$-$114_B$ (collectively, blade servers 114). Each blade server 114 includes a plurality of CPUs $115_1$-$115_C$ (collectively, CPUs 115). Each CPU 115 may have one or more associated CPU cores (omitted for purposes of clarity). The CPUs are configured to host VMs. The typical arrangement and operation of racks 112, blade servers 114, and CPUs 115 within datacenters 111 will be understood by one skilled in the art. It is noted that any suitable types, numbers, and/or arrangements of racks 112, blade servers 114, and CPUs 115 may be used within any of datacenters 111. Although primarily depicted and described herein with respect to specific numbers of datacenters 111, racks 112, blade servers 114, and CPUs 115, it is noted that any other suitable numbers of datacenters 111, racks 112, blade servers 114, and/or CPUs 115 may be used in cloud environment 110 (e.g., cloud environment 110 may include one or more datacenters 111, each datacenter 111 may include one or more racks 112, each rack may include one or more blade servers 114, and each blade server 114 may include one or more CPUs 115).

The datacenters 111 each include datacenter communication resources configured to support intra-datacenter communications and inter-datacenter communications.

The datacenter communication resources of datacenter 111 are arranged hierarchically (although it is noted that other types of arrangements may be used). The CPUs 115 of the same blade server 114 can communicate directly (e.g., without going through any switch).

The CPUs 115 of the blade servers 114 of the same rack 112 can communicate via a top-of-rack (TOR) switch 113 associated with the rack 112 (illustratively, TOR switches $113_1$-$113_R$ associated with racks $112_1$-$112_R$, respectively).

The CPUs 115 of the blade servers 114 of different racks 112 can communicate via one or more switches 114 (typically referred to as aggregator switches) and/or routers 117. In the exemplary datacenter $111_1$, for example, adjacent pairs of racks 112 are coupled to aggregator switches 116 (illustratively, TOR switches $113_1$ and $113_2$ of racks $112_1$ and $112_2$ are coupled to an aggregator switch $116_1$ and, similarly, rack $112_R$ is coupled to an aggregator switch $116_A$). While omitted for purposes of clarity, it will be appreciated that the aggregator switches 116 (denoted as first-layer aggregator switches) may be connected to second-layer aggregator switches in the datacenter (e.g., where sets of first-layer aggregator switches 116 including two or more adjacent aggregator switches 116 each are coupled to a second-layer aggregator switch, where sets of second-layer aggregator switches including two or more adjacent aggregator switches 116 each are coupled to a third-layer aggregator switch, and so forth). In this sense, the racks 112 and aggregator switches 116 may be arranged in a hierarchical tree structure. As a result, latency between CPUs 115 of blade servers 114 in racks 112 within a datacenter 111 depends on the positions of the racks 112 within the hierarchical tree structure formed by the racks 112 and aggregator switches 116 (and, thus, latency of communication between VMs provisioned for a user depends on the physical resources of the datacenter 111 on which the requested VMs are provisioned).

The datacenter communication resources of datacenter 111 are arranged with an assumption of locality of communications. There is an assumption that a significant portion of the communications within each datacenter 111 will be between CPUs 115 of the same rack 114. As the distance between CPUs 115 within a datacenter 111 increases, the available communication bandwidth between the CPUs 115 decreases. As a result, the available communication bandwidth for requested VMs provisioned within a datacenter 111 (which will communicate with each other via intra-datacenter communication resources once provisioned) depends, at least in part, on the CPUs 115 of the datacenter 111 on which the requested VMs are provisioned. In a similar sense, the overall efficiency of the datacenter 111 also depends, at least in part, on the CPUs 115 on which the requested VMs are provisioned within the datacenter 111. As a result, the number of user requests that can be accepted for hosting within cloud environment 110 also depends, at least in part, on the CPUs 115 on which the requested VMs are provisioned within the datacenters 111, respectively.

The racks 112 of the datacenter 111 communicate outside of the datacenter 111 via a router 117 (and, optionally, one or more layers of aggregator switches 116, as depicted).

The typical arrangement and operation of datacenter communication resources will be understood by one skilled in the art.

It is noted that any suitable types, numbers, and/or arrangements of switches (e.g., TOR switches 113, aggregate switches 116, and the like) and/or routers (e.g., router 117) may be used in order to support intra-datacenter and inter-datacenter communications within any of datacenters 111.

The CMS 120 is configured to provide management functions for management of cloud environment 110. The management functions typically provided by a cloud management system for a cloud environment will be understood by one skilled in the art. The CMS 120 maintains cloud management information associated with management of cloud environment 110. The CMS 120 provides cloud management information to CAS 140 for use in determining the assignment of VMs to physical resources of the cloud environment 110 in response to user requests. The cloud management information may include datacenter resource information (e.g., current available resources, resources expected to be available in the future, current allocation of resources, allocation of resources expected in the future, types of resources, arrangement of resources, capabilities of resources, and the like) associated with each of the datacenters 111, datacenter topology information (e.g., associated with connectivity within each rack, connectivity between racks, and the like) associated with each of the datacenters 111, datacenter status information (e.g., resource status information, connectivity status information, and the like) associated with each of the datacenters 111, and the like, as well as various combinations thereof.

The NMS 130 is configured to provide management functions for management of CN 150. The management functions typically provided by a network management system for a communication network will be understood by one skilled in the art. The NMS 130 maintains network management information associated with management of CN 150. The NMS 130 provides network management information to CAS 140 for use in determining the assignment of VMs to physical resources of the cloud environment 110 in response to user requests. The network management information may include network topology information, network status information, and the like, as well as various combinations thereof.

The CAS 140 is configured to determine assignment of requested VMs to physical resources of cloud environment 110 in response to a user request for the VMs.

The CAS 140 is configured to receive a user VM request requesting provisioning of VMs within cloud environment 110. The user VM request includes user VM request information for use by CAS 140 in determining assignment of the requested VMs to physical resources of cloud environment 110. The user VM request information includes a number of VMs requested. The user VM request information also may include communication requirements for communication among the requested VMs. The user VM request information also may include one or more VM assignment constraints (e.g., one or more of VM placement constraints, VM communication constraints, VM resiliency constraints, VM type constraints, and the like). The VM assignment constraints may include one or more of maximum number of VMs to be assigned per rack 112, minimum number of VMs to be assigned per rack 112, maximum number of racks 112 to be used per datacenter 111 (e.g., to reduce inter-rack traffic), minimum number of racks 112 to be used per datacenter 111 (e.g., for resiliency), maximum number of VMs to be assigned per datacenter 111 (e.g., for resiliency), minimum number of VMs to be assigned per datacenter 111 (e.g., to reduce inter-datacenter traffic), maximum number of datacenters 111 to be used (e.g., to reduce inter-datacenter traffic), minimum number of datacenters 111 to be used (e.g., for resiliency), types of blade servers 114 to be used based on types of VMs to be assigned, and the like, as well as various combinations thereof. The user VM request information may include any other information suitable for use in determining assignment of requested VMs within cloud environment 110.

The CAS 140 is configured to receive management information for use by CAS 140 in determining assignment of the requested VMs to physical resources of cloud environment 110. For example, CAS 140 may receive management information which includes cloud management information from CMS 120, network management information from NMS 130, and the like.

The CAS 140 may determine assignment of requested VMs to physical resources of cloud environment 110 using user VM request information receive with the user VM request, management information associated with portions of system 100, and the like, as well as various combinations thereof.

The CAS 140 may be configured to determine assignment of requested VMs to physical resources of cloud environment 110 in a manner for reducing resource usage (e.g., reducing inter-rack communication within datacenters 111 and reducing inter-datacenter communication between datacenters 111) and providing improved performance to the user application(s) that will use the VMs once they are provisioned in the cloud environment 110. The reduction of inter-rack communication within datacenters 111 may be provided by reducing the number of racks 112 of a datacenter 111 to which VMs are assigned, assigning VMs to racks 112 relatively close to each other where possible, and the like. The reduction of inter-datacenter communication between datacenters 111 may be provided by reducing the number of datacenters 111 to which VMs are assigned, assigning VMs to datacenters 111 based on knowledge of communication capabilities between datacenters 111, assigning VMs to datacenters 111 based on knowledge of traffic between the datacenters 111 and the client location(s) of the client(s) expected to be using the VMs once they are provisioned in the cloud environment 110, and the like.

The CAS 140 may be configured to may determine assignment of requested VMs to physical resources of cloud environment 110 based on one or more other characteristics of the user VM request (e.g., elasticity, fault tolerance, and the like). For example, CAS 140 may be configured to assign VMs in a manner for ensuring room for growth (e.g., where the user may need or want to add one or more additional VMs in the future). For example, CAS 140 may be configured to assign VMs while considering fault scenarios, such that the resultant assignment of VMs enables fast recovery from faults in cloud environment 110 and/or CN 150.

The manner in which CAS 140 determines assignment of requested VMs to physical resources of cloud environment 110 may be better understood by way of reference to FIGS. 2-6.

The CAS 140 may specify assignment of the requested VMs to physical resources of cloud environment 110 in terms of VM assignment information. The VM assignment information includes identification of the datacenters in which the requested VMs are to be placed, identification of equipment within the datacenters on which the requested VMs are to be placed (e.g., in terms of the rack 112, blade server 114, and CPU 115 (and, optionally core) on which each VM is to be placed), and the like. The VM assignment information also may include network configuration information configured for use in provisioning connectivity between the requested VMs.

The CAS 140 may maintain various type of information in an associated database 141. For example, database 141 associated with CAS 140 may store information received by CAS 140 (e.g., user VM request information, management information, and the like), VM assignment information determined by CAS 140, and the like, as well as various combinations thereof.

The CAS 140 is configured to participate in provisioning of the requested VMs within cloud environment 110 based on the VM assignment information. In one embodiment, CAS 140 is configured to perform provisioning of the requested VMs within cloud environment 110 based on the VM assignment information (e.g., via generation of associated VM provisioning requests based on the VM assignment information and propagation of the VM provisioning requests to the cloud environment 110). In one embodiment, CAS 140 is configured to initiate provisioning of the requested VMs within cloud environment 110 based on the VM assignment information, e.g., by providing the VM assignment information for the user VM request to one or more management systems (e.g., one or more of CMS 120, NMS 130, and the like), for use by the one or more management systems in provisioning the requested VMs within cloud environment 110 based on the VM assignment information.

The CAS 140 may be configured to perform various other functions in support of the virtual resource assignment capability.

The CN 150 may be any type of communication network suitable for supporting communication between datacenters 111. For example, CN 150 may be provided using one or more of a public data network (e.g., the Internet), one or more private data networks, and the like, as well as various combinations thereof.

Figure 2:
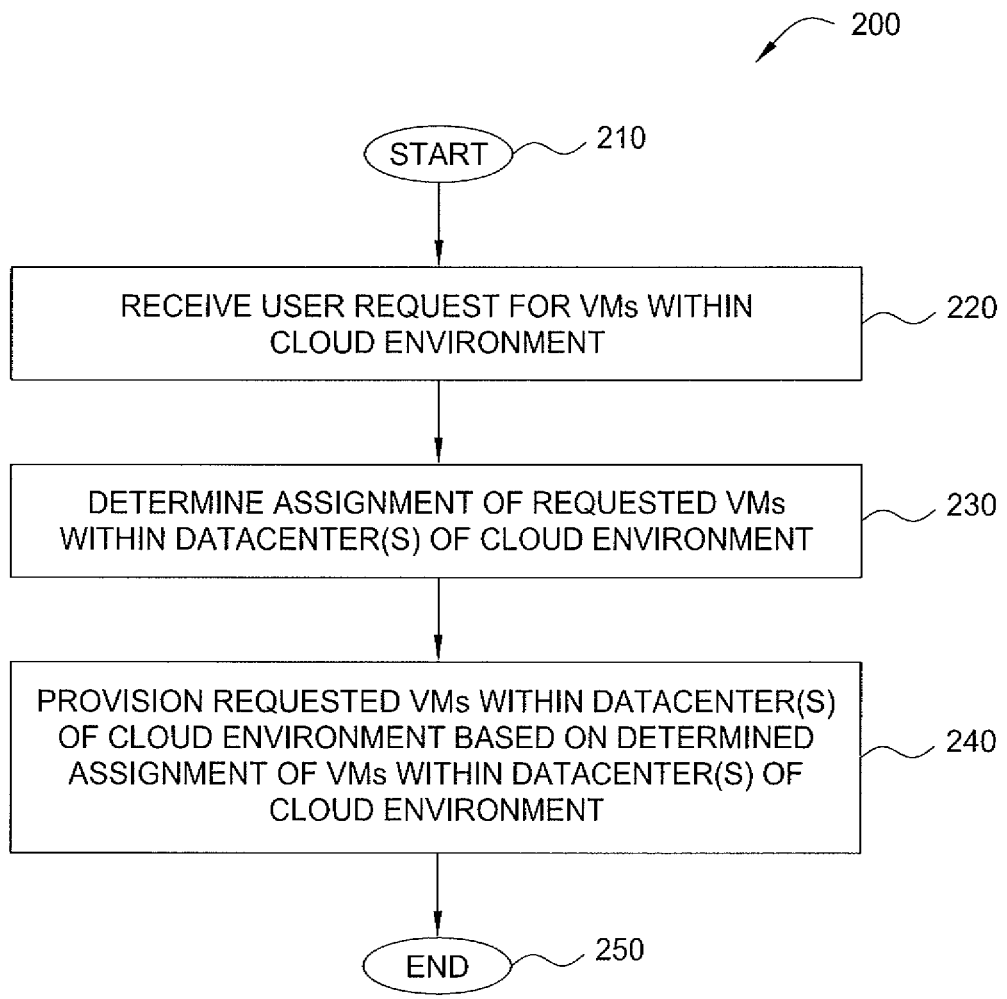
FIG. 2 depicts one embodiment of a method for provisioning VMs within datacenters of a cloud environment in response to a user request for VMs.

FIG. 2 depicts one embodiment of a method for provisioning VMs within datacenters of a cloud environment in response to a user request for VMs. Although depicted and described as being performed serially, it is noted that the steps of method 200 may be performed contemporaneously and/or in a different order than presented.

At step 210, method 200 begins. The method 200 may begin in response to any suitable condition or trigger.

At step 220, a user VM request is received, requesting provisioning of VMs within the cloud environment. The user VM request includes user VM request information. The user VM request information includes a number of VMs requested by the user. The user VM request information also may include communication requirements for communication among the requested VMs. The user VM request information also may include one or more VM assignment constraints (e.g., one or more of VM placement constraints, VM communication constraints, VM resiliency constraints, and the like). The user VM request information may include any other information suitable for use in determining placement of the requested VMs within the datacenters.

At step 230, assignment of the requested VMs within datacenters is determined. The assignment of the requested VMs within datacenters is determined using the user VM request information, network management information, datacenter management information, and the like, as well as various combinations thereof. The assignment of the requested VMs within datacenters may be specified in terms of VM assignment information. The VM assignment information includes identification of the datacenters in which the requested VMs are to be placed, identification of equipment within the datacenters on which the requested VMs are to be placed (e.g., in terms of the rack, blade server, and CPU (an, optionally, core) on which each VM is to be placed), and the like. The VM assignment information also may include network configuration information configured for use in provisioning connectivity between the requested VMs. In one embodiment, assignment of the requested VMs within datacenters is determined as depicted and described with respect to FIG. 3.

At step 240, the requested VMs are provisioned within the cloud environment using the VM assignment information. The provisioning of the requested VMs within the cloud environment may be performed in any suitable manner (e.g., using provisioning messages sent to the datacenters within which the requested VMs are to be assigned).

At step 250, method 200 ends.

Figure 3:
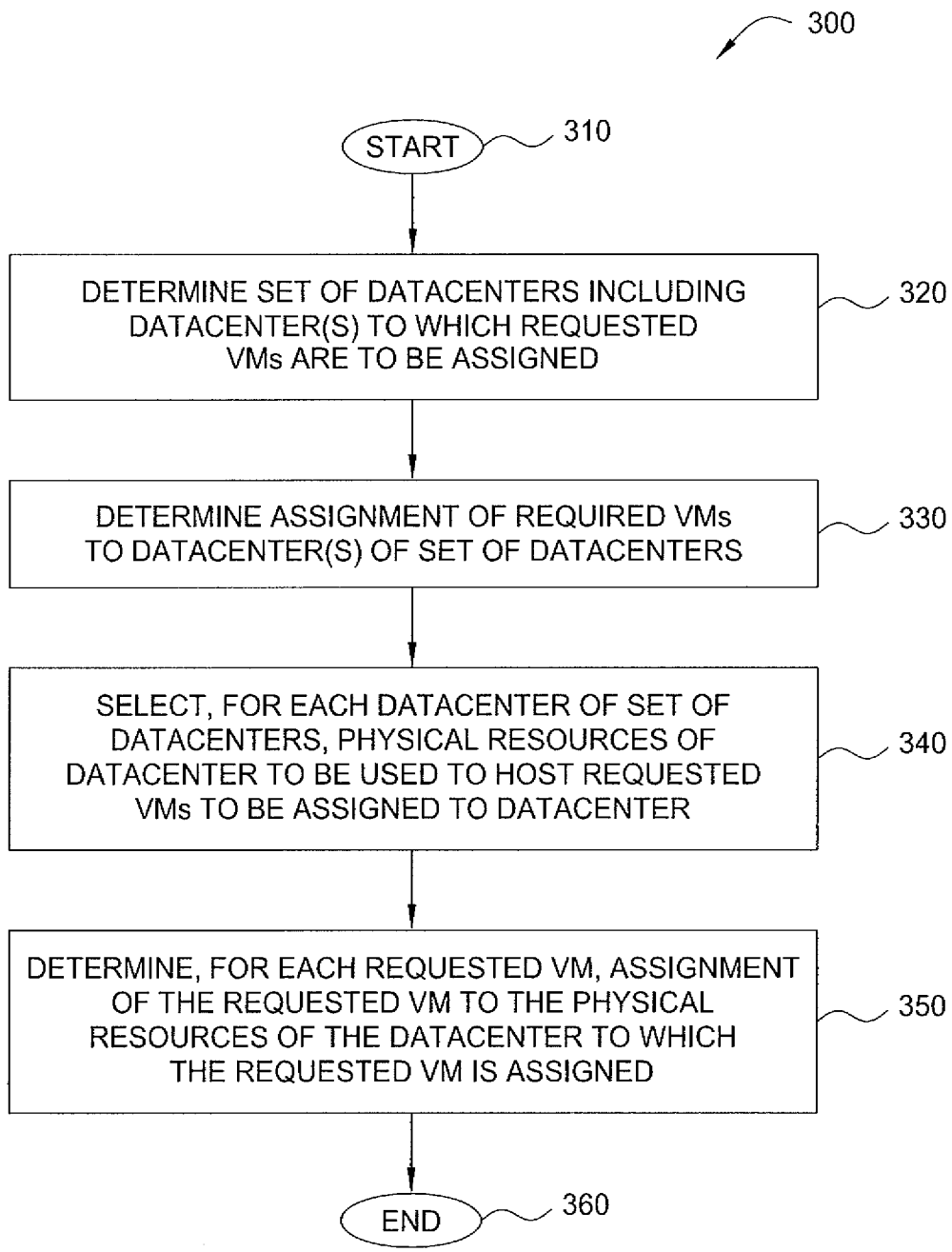
FIG. 3 depicts one embodiment of a method for determining assignment of VMs to physical resources within datacenters for use in provisioning VMs within datacenters of a cloud environment.

FIG. 3 depicts one embodiment of a method for determining assignment of VMs within datacenters for use in provisioning VMs within datacenters of a cloud environment. Although depicted and described as being performed serially, it is noted that the steps of method 300 may be performed contemporaneously and/or in a different order than presented.

At step 310, method 300 begins.

At step 320, a set of datacenters is determined for the requested VMs.

The set of datacenters includes one or more datacenters to which the requested VMs will be assigned. The set of datacenters includes one or more of the available datacenters of the cloud environment. It is noted that a single datacenter may not have enough capacity to host all of the requested VMs and, further, that even if there is enough capacity in a single datacenter to host all of the requested VMs, the user may want to distribute the requested VMs across multiple datacenters to improve resiliency.

The set of datacenters may be determined using user VM request information. The set of datacenters may be determined using one or more of network management information, datacenter management information, and the like, as well as various combinations thereof. The set of datacenters may be determined using any other information suitable for use in determining the set of datacenters.

In one embodiment, the set of datacenters is determined in a manner tending to (1) minimize the number of datacenters in the set of datacenters and (2) reduce inter-datacenter traffic associated with placement of the requested VMs (and, thus, minimize network bandwidth that is consumed).

In one embodiment, the set of datacenters is determined by selecting a subset of the available datacenters that (1) minimizes the maximum distance (e.g., hop count) between any two datacenters (2) subject to one or more constraints (e.g., availability of the desired number of VMs, minimum and/or maximum number of VMs placed in each datacenter, and the like). It is noted that selection of the subset of datacenters satisfying these conditions may be viewed as a subgraph selection problem (which is denoted herein as the datacenter selection problem MINDIAMETER), a description of which follows.

Let the set of available datacenters be represented as a graph (G). The graph G=(V,E) consists of vertices (V) and edges (E). The vertices (V) correspond to the datacenters. The vertices (V) have vertex weights (w) associated therewith, where the weight (w) of a vertex (V) corresponds to the number of available VMs in the datacenter. The graph is a complete graph, where the edges (E) correspond to communication paths (e.g., via the Internet and/or any other associated packet networks) that connect the datacenters. The edges (E) have edge weights or lengths (l) associated therewith, where the length (l) of an edge (E) between two datacenters corresponds to the distance (e.g., number of hops) between the datacenters.

In one embodiment, the initial graph G may be modified based on one or more VM assignment constraints which may be specified in the user VM request. If the user VM request includes a constraint on the maximum number of VMs that may be placed within a datacenter, then the weights of the vertices (V) cannot be greater than that constraint (i.e., vertices having weights greater than the constraint are removed from the graph). If the user VM request includes a constraint on the minimum number of VMs that may be placed within a datacenter, then the weights of the vertices (V) cannot be less than that constraint (i.e., vertices having weights less than the constraint are removed from the graph).

Let s represent the number of VMs requested in the user VM request. In one embodiment, the datacenter selection problem MINDIAMETER(s) corresponds to finding a subgraph of G whose sum of weights is at least s and with minimum diameter (i.e., a maximum length of any shortest distance between the vertices). It is noted that, since the original graph G is a complete graph, the subgraph induced by the selected vertices also is complete. As such, in one embodiment, datacenter selection problem MINDIAMETER(s) corresponds to finding such a subgraph whose length of the longest edge is minimum.

It is noted that the datacenter selection problem MINDIAMETER(s) is NP-hard and cannot be approximated within $2-\epsilon$ for any $\epsilon > 0$. It is further noted that the datacenter selection problem MINDIAMETER(s) can be reduced from a max clique problem, where the problem is to find a clique of maximum size. The reduction is as follows. Given an instance $G=(V,E)$ of a max clique problem, an instance of smallest diameter subgraph problems is created. A new complete graph $G'=(V',E',w,l)$ is created. The vertices of G' are same as the vertices of G, and have a weight of one (1). If there is an edge between two vertices u and v in G, then the length of the edge between the corresponding vertices of G' is one (1); otherwise, the length of the edge between the vertices is two (2). The edges in this graph satisfy the triangle inequality. A subgraph of G' has a diameter of one (1), if and only if the corresponding subgraph in G is a clique. This is because, if G has a clique of size k, then the corresponding vertices of G' can be taken to form a subgraph of weight k and diameter one (1). Similarly, if G' has a subgraph of weight k and diameter 1, then the corresponding vertices of G forms a clique of size k. A subgraph of G' has a diameter of one (1), if and only if the corresponding subgraph in G is a clique. Hence, the solution to the max clique problem may be found by finding maximum $s \in \{n, n-1, \ldots 1\}$ for which there exist a subgraph of size s and diameter one (1).

It is again noted that datacenter selection problem MINDIAMETER(s) cannot be approximated within a factor $2-\epsilon$ for any $\epsilon > 0$, unless P=NP. If there is $2-\epsilon$ approximation process for datacenter selection problem MINDIAMETER(s), then the max clique problem may be solved as follows. In order to find a clique of size k, create a MINDIAMETER problem with weight k using the above reduction. If there is a clique of size k, then there exists a subgraph for the datacenter selection problem MINDIAMETER(s) of diameter one (1). If there is no such clique, then the diameter of the datacenter selection problem MINDIAMETER(s) is at least two (2). Hence, if a $2-\epsilon$ process for the datacenter selection problem MINDIAMETER(s) returns a subgraph whose diameter is less than two (2), then there is clique of size k in the original graph G.

In one embodiment, an approximation process is provided for solving the minimum diameter subgraph problem (i.e., datacenter selection problem MINDIAMETER(s)). In one embodiment, the diameter of the subgraph output by the process is at most twice the diameter of the optimal subgraph. For the approximation process, it is assumed that triangle inequality holds for the edge weights in the graph. It is noted that the triangle inequality is valid in this problem settings, because the length of the edges corresponds to path length between the corresponding datacenters. It is further noted that if there is a triangle inequality violation between three datacenters, conformance with the triangle inequality may still be maintained by forcing the longer edge to take a path formed by the shorter edges.

In one embodiment, the approximation process is provided for solving the minimum diameter subgraph problem is implemented as two processes, denoted herein as a FindMinStar(G,v,s) process (depicted and described in FIG. 4A) and a MinDiameterGraph(G,s) process (depicted and described in FIG. 4B), descriptions of which follow. It is noted that, although primarily depicted and described as separate processes, these processes may be implemented as fewer or more processes which may be executed for providing the described functions. It is further noted that, although depicted and described with respect to specific implementations of the processes (e.g., specific variables, specific arrangement of steps of the processes, and the like), these processes may be implemented in any other manner suitable for providing the described functions.

Figure 4B:

As noted herein, the FindMinStar(G,v,s) process 410 of FIG. 4A and the MinDiameterGraph(G,s) process 420 of FIG. 4B are configured to determine a set of datacenters to which VMs are to be assigned.

As depicted in FIG. 4A, the FindMinStar(G,v,s) process 410 is configured to find a subgraph of weight at least s that includes vertex v. A star topology centered at vertex v is found by adding nodes in increasing order of length to v, until the weight of the star topology is at least s. The final subgraph is formed by adding the edges induced by the nodes in the star. The FindMinStar(G,v,s) process 410 also computes the diameter of the resulting subgraph by maintaining the diameter as the nodes are added (subject to the constraint that, when a node is added, the diameter of the subgraph can change only if the length of the edges induced by that node is greater than the current diameter).

As depicted in FIG. 4B, the MinDiameterGraph(G,s) process 420 is configured to find a subgraph of weight at least s by invoking the FindMinStar(G,v,s) process 410 for each of the vertices. The MinDiameterGraph(G,s) process 420 then selects the subgraph with the smallest diameter.

The FindMinStar(G,v,s) process 410 finds a subgraph of weight at least s, whose length of any edge incident on v is minimum. The FindMinStar(G,v,s) process 410 first adds vertex v to the subgraph. The FindMinStar(G,v,s) process 410 then adds the vertices adjacent to v, in the increasing order of edge weights, until the sum of the weight of the vertices in the subgraph is s. Hence, the FindMinStar(G,v,s) process 410 finds a subgraph with smallest edge weights for the edges incident on v.

The MinDiameterGraph(G,s) process 420 finds a subgraph of weight at least s, whose diameter is at most twice the optimum. The MinDiameterGraph(G,s) process 420 invokes the FindMinStar(G,v,s) process 410 for each of the vertices of G and selects the one with minimum diameter. Let v' be the node for which the diameter of the graph G' returned by the FindMinStar(G,v,s) process 410 was minimum, and let l' be the length of the longest edge incident on v' in the subgraph G'. Since the edge lengths follow the triangle inequality and G' is a complete graph, the length of any edge in G' is at most 2l' and, thus, the diameter of G' is at most 2l'.

With respect to datacenter selection problem MINDIAMETER(s), it is noted that the approximation process for solving the datacenter selection problem MINDIAMETER(s) is a 2-approximation process. Let $G_{opt}$ be the optimal solution to datacenter selection problem MINDIAMETER(s). Let l" be the longest edge of $G_{opt}$. Let u" and v" be the end points of l". Since the edges of $C_{opt}$ satisfy the triangle inequality, the shortest distance in $G_{opt}$ between u" and v" is l". Hence the diameter of $G_{opt}$ is at least l". Now consider the graph G" returned by the FindMinStar(G,v,s) process 410 while running the MinDiameterGraph(G,s) process 420. As noted above, the lengths of edges incident on v" on G" is at most l". Since the diameter of G" is at most 2l", the diameter of the subgraph returned by the MinDiameterGraph process 420 (i.e. G') is at most 2l". Hence, the approximation process for solving the datacenter selection problem MINDIAMETER(s) is a 2-approximation process.

Returning now to FIG. 3, it is noted that determination of the set of datacenters for the requested VMs may be performed in other ways (e.g., using other information, in a manner for satisfying other conditions, using other processes, and the like, as well as various combinations thereof).

At step 330, assignment of the requested VMs to the datacenters in the set of datacenters is determined.

The assignment of the requested VMs to the datacenters in the set of datacenters specifies, for each datacenter of the set of datacenters, the number of requested VMs to be assigned to the datacenter. It is noted that assignment of the requested VMs to the datacenters in the set of datacenters does not necessarily specify the equipment of the datacenters to which the VMs will be assigned (as this may be determined at step 340) or which of the VMs are to be assigned to which of the datacenters (as this may be determined at step 350).

The requested VMs may be assigned to the datacenters in the set of datacenters using one or more of user VM request information, network management information, datacenter management information, and the like, as well as various combinations thereof. In one embodiment, the requested VMs are assigned to the datacenters in the set of datacenters in a manner tending to minimize inter-datacenter traffic. In one embodiment, the requested VMs are assigned to the datacenters in the set of datacenters in accordance with one or more VM assignment constraints specified in the user VM request. In one embodiment, for example, in which the user VM request information includes a VM type constraint associated with assigning different types of VMs to different datacenters, the requested VMs are assigned to the datacenters in the set of datacenters based on the VM type constraint.

In one embodiment, the requested VMs are assigned to the datacenters in the set of datacenters using a VM assignment process configured for assignment of VMs to datacenters. In general, the goal of the VM assignment process is to divide the graph into pieces of equal size, such that there are few connections between the pieces of the graph (thereby minimizing the network communications resources required to support the requested VMs). However, even the simplest case of dividing a graph into two equal pieces, typically referred to as a graph bisection problem, is NP-hard. Additionally, a related problem is the K-cut problem, in which the goal is to divide the graph into K pieces where the size of each piece also is specified as an input.

In the VM assignment process, the user VM request may be viewed as a graph that needs to be partitioned. The nodes of the graph represent the VMs and links of the graph represent the relative bandwidth required between pairs of VMs connected by the links. Each partition of the graph represents the set of VMs that need to be assigned to the same datacenter. The size of the each partition needs to be upper-bounded by the amount of resources available in the datacenter for hosting VMs. Unlike the traditional graph partition problem, this problem may not specify the exact number of nodes in each partition; rather, it only specifies the maximum nodes in each partition. This is because, at any point, there may be more resources available for hosting VMs in the cloud environment than the number of VMs requested by the user. As a result, the VM assignment process may optimize communication (between datacenters) by assigning the VMs within the datacenter(s) having the maximum resources available for hosting VMs. For assignment of VMs to datacenters, the inter-datacenter communication cost depends on the communication routing between the datacenters. Thus, in order to minimize communication costs of the application, the communication distance between the datacenter partitions is taken into consideration.

With respect to the VM assignment process, the problem may be generalized as follows. Given a graph $G=(V,E)$ with assignment of edge weight w: $E \rightarrow N$, and set of partition capacities $k1, k2, \ldots$ with distance between partitions i and j as $d(i,j)$. Partition V into disjoint sets $C1, C2 \ldots, Cm$ such that $|C_i| \leq K_i$ and $\sum_{i=1}^{k} \sum_{j=i+1}^{k} \sum_{v_1 \in C_i, v_2 \in C_j} w(v_1, v_2) d(i,j)$.

With respect to the VM assignment process, it is noted that either individual user requests may be handled separately in an incremental fashion, or all multiple requests can be combined together to form a large partitioned graph that does not contain any edges between the nodes of different user requests.

With respect to the VM assignment process, it is noted that the graph partitioning problem is NP-hard, and there are no processes with good (e.g., constant) approximation guarantees.

In one embodiment, the VM assignment process is implemented as a greedy heuristics process.

In one embodiment, the VM assignment process selects one datacenter at a time. The datacenters may be selected in any suitable order (e.g., each selection being performed such that the datacenter with the maximum amount of resources available for hosting VMs is selected, based on one or more VM assignment constraints specified in the user VM request, and the like, as well as various combinations thereof) and assigns as many VMs as possible to the selected datacenter. The VM assignment process selects a VM with a maximum value of a parameter (e.g., incoming/outgoing bandwidth, number of neighbors, and the like) and assigns the selected VM to the selected datacenter. The selected VM is added to a set C, which is the set of VMs assigned to the selected datacenter. The VM assignment process then considers all of the neighbors of C and selects the VM that has the maximum traffic to/from C, and adds the selected VM to the set C. This process may be repeated until a condition is satisfied for the selected datacenter (e.g., all of the available resources of the selected datacenter have been exhausted, a maximum amount of VMs per datacenter constraint is satisfied for the selected datacenter, and the like). The VM assignment process then selects the next datacenter and repeats the process for the next selected datacenter and the graph of the remaining VMs which have not yet been assigned (i.e., V-C) to a datacenter.

In one embodiment, the VM assignment process is modified by exchanging certain nodes. The VM assignment process considers pairs of nodes that are present in different partitions. The VM process may determine whether or not interchanging of the considered nodes improves the solution (e.g., uses less inter-datacenter bandwidth). The VM process may determine whether or not moving a node between partitions (e.g., from its current partition to a different partition that has available capacity) improves the solution. The VM assignment process selects one or more of the considered moves and commits the selected move(s). It is noted that this process may be repeated (e.g., until a threshold number of moves have been committed, until all moves have been considered and there is no further improvement in the VM assignment, and the like).

At step 340, for each datacenter in the set of datacenters, physical resources of the datacenter, to be used to host the requested VMs to be assigned to the datacenter, are selected.

The selection of the physical resources within a datacenter may include selection of the rack(s) of the datacenter to be used to host the VMs assigned to the datacenter. The selection of the physical resources within a datacenter may further include selection of the blade server(s) on the selected rack(s). The selection of the physical resources within a datacenter may further include selection of the CPU(s) on the selected blade server(s) of the selected rack(s). The selection of the physical resources within a datacenter may further include selection of the core(s) on the selected CPU(s) of the selected blade server(s) of the selected rack(s). In this sense, the process used for selection of the physical resources within a datacenter may be referred to herein more generally as an equipment selection process, machine selection process, and/or physical resource selection process). It is noted that selection of the physical resources does not necessarily specify the mapping of the VMs to be assigned to the datacenter to the selected physical resources of the datacenter (as this may be determined at step 350).

The selection of the physical resources of the datacenter may be performed in a manner tending to minimize inter-rack traffic between the VMs within the datacenter. This will tend to prevent long communication paths between the VMs assigned to the datacenter, thereby preventing large latency in communication between VMs within the datacenter and reducing usage of resources (e.g., communication resources) within the datacenter.

This may provide significant reductions in communication delays in larger datacenters (e.g., those having hundreds of racks, thousands of racks, or even more racks), where the any communications between racks that are not located relatively close to each other may have to traverse various numbers/levels of aggregation switches.

The selection of the physical resources of the datacenter may be performed in a manner tending to provide elasticity.

It is noted that selection of the physical resources of the datacenter may improve datacenter utilization and performance of the user application(s) for which the VMs are requested.

In one embodiment, selection of the rack(s) of the selected datacenters is performed using a rack selection process (e.g., an implementation of the machine selection process in which the rack(s) for the requested VMs are selected).

In one embodiment, the rack selection process is implemented as a modified version of the datacenter selection process used for selection of the datacenters. In this embodiment, the rack selection process is a 2-approximation process configured to minimize the maximum distance between the racks. In this embodiment, the vertices of the graph represent the racks and, for each rack, the associated weight of the rack represents the amount of resources available in the rack for supporting VMs assigned to the datacenter.

In one embodiment, in which the topology of the datacenter is a hierarchical network, the rack selection process may determine an optimal solution to the rack selection problem. The topology may be considered to be a tree topology, where the root node of the tree represents the highest layer switch or switches (e.g., the router providing connectivity to/from the datacenter), the children nodes of the root node represent the network layer of switches (e.g., top-level aggregate switches), and so forth, down to the leaf nodes which represent the racks. It is noted that, in this tree, all of the leaf nodes are at the same level. The tree is augmented to include labels that are indicative, for each rack, of the amount of resources of the rack that are available for supporting the VMs assigned to the datacenter.

In one embodiment, selection of the blade server(s) of the rack(s) is performed using a blade server selection process (e.g., an implementation of the machine selection process in which the rack(s) and blade server(s) for the requested VMs are selected). In one embodiment, the blade server selection process is implemented as a modified version of the rack selection process, where the leaf nodes of the tree represent the blade server level and the parent nodes of the leaf nodes represent the racks.

In one embodiment, selection of the CPU(s) of the blade server(s) of the rack(s) is performed using a CPU selection process (e.g., using an implementation of the machine selection process in which the rack(s), blade server(s), and CPU(s) for the requested VMs are selected). In one embodiment, the CPU selection process is implemented as a modified version of the rack selection process, where the leaf nodes of the tree represent the CPU level, the parent nodes of the CPU nodes represent the blade servers, and the parent nodes of the blade server nodes represent the racks.

As described above, the machine selection process may be executed, for a datacenter, for selecting the machine(s) within the datacenter to which the VMs assigned to the datacenter are to be assigned.

In one embodiment, the machine selection process is configured, for a given datacenter to which VMs are assigned, to minimize the maximum communication distance between any two VMs assigned to the datacenter. This may be translated into finding a rooted sub tree of minimal height whose sum of the labels on the leaves is at least the target number of VMs required. As in the datacenter selection process, the machine selection process may take into account one or more VM assignment constraints (e.g., the maximum number of VMs which may be assigned per rack, the minimum number of VMs which may be assigned per rack, and the like). These types of VM assignment constraints may be accounted for by changing the weight(s) of the node(s) that represent the rack(s) in accordance with the VM assignment constraint(s).

In one embodiment, the machine selection process is implemented as the FindMinHeightTree(T, r, s) process (depicted and described in FIG. 5).

As depicted in FIG. 5, the FindMinHeightTree(T, r, s) process 500 is configured to, for a given datacenter, select the physical resources of the datacenter to be used for hosting the VMs assigned to that datacenter. Let s be the number of VMs to be assigned within the datacenter. Let T be the tree representation of the datacenter resources (e.g., computing resources, network resources, and the like). The following two variables are associated with each node in T: (1) weight (v), which represents the amount of datacenter resources, available for supporting VMs, that is rooted at node v and (2) height(v), which represents the height of the node. The weight variables of only the leaf nodes are initialized. The FindMinHeightTree(T, r, s) process 500 finds a subtree rooted at r whose leaf nodes have a cumulative weight of at least s and of minimum height. The FindMinHeightTree(T, r, s) process 500 performs an in-order traversal of the tree, and maintains the height and weight of each node as well as root of the minimum height subtree with weight at least s.

Returning now to FIG. 3, it is noted that selection of the physical resources of the datacenters may be performed in other ways (e.g., using other information, in a manner for satisfying other conditions, using other processes, and the like, as well as various combinations thereof).

At step 350, for each requested VM, the assignment of the requested VM to the physical resources of the datacenter to which the requested VM is assigned is determined.

The assignment of a VM to the physical resources of a datacenter includes assignment of the VM to the rack, blade server, and CPU (and, optionally, core on the CPU) on which the VM is to be hosted.

The requested VMs may be assigned to the physical resources of the datacenter in which the VM is to be hosted using one or more of user VM request information, datacenter management information, and the like, as well as various combinations thereof. In one embodiment, assignment of a VM to the physical resources of the datacenter in which the VM is to be hosted may be performed in a manner tending to minimize inter-rack traffic within the datacenter. In one embodiment, assignment of a VM to the physical resources of the datacenter in which the VM is to be hosted may be performed in accordance with one or more VM assignment constraints specified in the user VM request. In one embodiment, for example, in which the user VM request information includes a VM type constraint associated with assigning different types of VMs to different datacenters, assignment of a VM to the physical resources of the datacenter in which the VM is to be hosted may be performed based on the VM type constraint.

In one embodiment, assignment of a VM to the physical resources of the datacenter in which the VM is to be hosted is performed using a VM assignment process configured for assignment of VMs to physical resources of datacenters. In general, the goal of the VM assignment process is to divide the graph into pieces of equal size, such that there are few connections between the pieces of the graph (thereby minimizing the datacenter communications resources required to support the requested VMs to be hosted within the datacenter). However, even the simplest case of dividing a graph into two equal pieces, typically referred to as a graph bisection problem, is NP-hard. Additionally, a related problem is the K-cut problem, in which the goal is to divide the graph into K pieces where the size of each piece also is specified as an input.

In the VM assignment process, the user VM request may be viewed as a graph that needs to be partitioned. The nodes of the graph represent the VMs and links of the graph represent the relative bandwidth required between pairs of VMs connected by the links. Each partition of the graph represents the set of VMs that need to be assigned to the same rack. The size of the each partition needs to be upper-bounded by the amount of resources available in the rack for hosting VMs. Unlike the traditional graph partition problem, this problem may not specify the exact number of nodes in each partition; rather, it only specifies the maximum nodes in each partition. This is because, at any point, there may be more resources available for hosting VMs in the cloud environment than the number of VMs requested by the user. As a result, the VM assignment process may optimize communication (between racks) by assigning the VMs within the rack(s) having the maximum resources available for hosting VMs. For assignment of VMs within a datacenter, the intra-datacenter communication cost between the racks may depend on proximity of the racks in the switching hierarchy of the datacenter. Thus, in order to minimize communications cost of the application, the communication distance between the rack partitions is taken into consideration.

With respect to the VM assignment process, the problem may be generalized as follows. Given a graph $G=(V,E)$ with assignment of edge weight w: $E \rightarrow N$, and set of partition capacities k1, k2, ... with distance between partitions i and j as $d(i,j)$. Partition V into disjoint sets C1, C2 ..., Cm such that $|C_i| \leq K_i$ and $\Sigma_{i=1}^{k} \Sigma_{j=i+1}^{k} \Sigma_{v_1 \in C_i, v_2 \in C_j} w(v_1, v_2) d(i,j)$.

With respect to the VM assignment process, it is noted that either individual user requests may be handled separately in an incremental fashion, or all multiple requests can be combined together to form a large partitioned graph that does not contain any edges between the nodes of different user requests.

With respect to the VM assignment process, it is noted that the graph partitioning problem is NP-hard, and there are no processes with good (e.g., constant) approximation guarantees.

In one embodiment, the VM assignment process is implemented as a greedy heuristics process.

In one embodiment, the VM assignment process selects one rack at a time. The racks may be selected in any suitable order (e.g., each selection being performed such that the rack with the maximum amount of resources available for hosting VMs is selected, based on one or more VM assignment constraints specified in the user VM request, and the like, as well as various combinations thereof) and assigns as many VMs as possible to the selected rack. The VM assignment process selects a VM with a maximum value of a parameter (e.g., incoming/outgoing bandwidth, number of neighbors, and the like) and assigns the selected VM to the selected rack. The selected VM is added to a set C, which is the set of VMs assigned to the selected rack. The VM assignment process then considers all of the neighbors of C and selects the VM that has the maximum traffic to/from C, and adds the selected VM to the set C. This process is repeated until all of the available resources of the selected rack have been exhausted. The VM assignment process then selects the next rack (having the maximum amount of resources available for hosting VMs) and repeats the process for the next selected rack and the graph of the remaining VMs which have not yet been assigned (i.e., V-C).

In one embodiment, the VM assignment process is modified by exchanging certain nodes. The VM assignment process considers pairs of nodes that are present in different partitions. The VM process may determine whether or not interchanging of the considered nodes improves the solution (e.g., uses less inter-rack bandwidth). The VM process may determine whether or not moving a node between partitions (e.g., from its current partition to a different partition that has available capacity) improves the solution. The VM assignment process selects one or more of the considered moves and commits the selected move(s). It is noted that this process may be repeated (e.g., until a threshold number of moves have been committed, until all moves have been considered and there is no further improvement in the VM assignment, and the like).

At step 360, method 300 ends.

Although primarily depicted and described herein within the context of embodiments in which the virtual resources are virtual machines (VMs) and the physical resources are processors of blade servers, it is noted that the virtual resource assignment capability may be used to determine assignment of various other types of virtual resources and/or to determine assignment to various other types of physical resources. Accordingly, various terms used herein that are specific to assignment of VMs may be read more generally as references to assignment of virtual resources. For example, references herein to VMs and VM assignment may be read more generally as virtual resources and virtual resource assignment, respectively. For example, references herein to VM assignment constraints used during VM assignment (e.g., VM placement constraints, VM communication constraints, VM resiliency constraints, VM type constraints, and the like) may be read more generally as virtual resource assignment constraints used during virtual resource assignment (e.g., virtual resource placement constraints, virtual resource communication constraints, virtual resource resiliency constraints, virtual resource type constraints, and the like). It is noted that various other VM-specific terms also may be read more generally in a similar manner.

Figure 6:
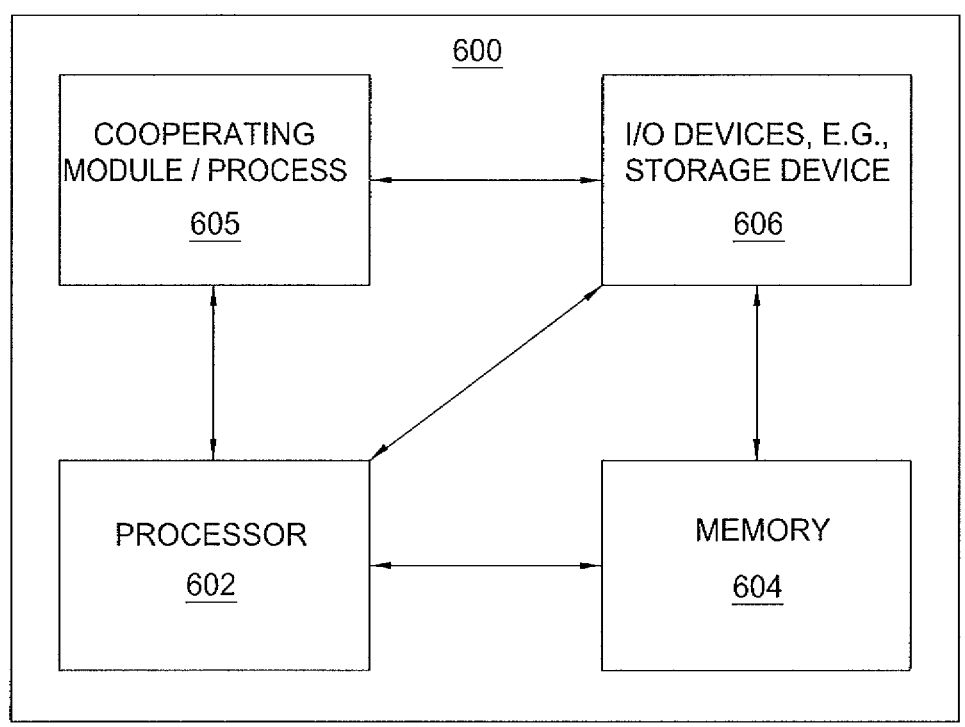
FIG. 6 depicts a high-level block diagram of a computer suitable for use in performing the functions described herein.

FIG. 6 depicts a high-level block diagram of a computer suitable for use in performing functions described herein.

As depicted in FIG. 6, computer 600 includes a processor element 602 (e.g., a central processing unit (CPU) and/or other suitable processor(s)) and a memory 604 (e.g., random access memory (RAM), read only memory (ROM), and the like). The computer 600 also may include a cooperating module/process 605 and/or various input/output devices 606 (e.g., a user input device (such as a keyboard, a keypad, a mouse, and the like), a user output device (such as a display, a speaker, and the like), an input port, an output port, a receiver, a transmitter, and storage devices (e.g., a tape drive, a floppy drive, a hard disk drive, a compact disk drive, and the like)).

It will be appreciated that the functions depicted and described herein may be implemented in software (e.g., via implementation of software on one or more processors) and/or hardware (e.g., using a general purpose computer, one or more application specific integrated circuits (ASIC), and/or any other hardware equivalents).

It will be appreciated that the functions depicted and described herein may be implemented in software for executing on a general purpose computer (e.g., via execution by one or more processors) so as to implement a special purpose computer, and/or may be implemented in hardware (e.g., using one or more application specific integrated circuits (ASIC) and/or one or more other hardware equivalents).

In one embodiment, the cooperating process 605 can be loaded into memory 604 and executed by processor 602 to implement functions as discussed herein. Thus, cooperating process 605 (including associated data structures) can be stored on a computer readable storage medium, e.g., RAM memory, magnetic or optical drive or diskette, and the like.

It will be appreciated that computer 600 depicted in FIG. 6 provides a general architecture and functionality suitable for implementing functional elements described herein and/or portions of functional elements described herein. For example, the computer 600 provides a general architecture and functionality suitable for implementing one or more of a blade server 114, CMS 120, NMS 130, and CAS 140.

It is contemplated that some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in fixed or removable media, transmitted via a data stream in a broadcast or other signal bearing medium, and/or stored within a memory within a computing device operating according to the instructions.

Although various embodiments which incorporate the teachings of the present invention have been shown and described in detail herein, those skilled in the art can readily devise many other varied embodiments that still incorporate these teachings.

What is claimed is:

1. An apparatus, comprising:
 a processor and a memory communicatively connected to the processor, the processor configured to:
  receive a request for virtual resources of a cloud environment comprising a set of available datacenters, the available datacenters including respective sets of physical resources available to host virtual resources, wherein the request comprises an amount of virtual resources requested and one or more virtual resource assignment constraints; and
  determine assignment of the requested virtual resources within the cloud environment based on the amount of virtual resources requested and the one or more virtual resource assignment constraints, wherein the processor is configured to determine assignment of the requested virtual resources within the cloud environment by:
   determining, from the set of available datacenters, a set of selected datacenters to which the requested virtual resources are to be assigned, the set of selected datacenters comprising two or more available datacenters from the set of available datacenters, wherein determining the set of selected datacenters to which the requested virtual resources are to be assigned comprises selecting a subset of the available datacenters that minimizes a maximum distance between any two of the available datacenters subject to one or more constraints;
   determining assignment of respective portions of the requested virtual resources to the datacenters in the set of selected datacenters, the requested virtual resources being assigned to two or more selected datacenters from the set of selected datacenters;
   selecting respective sets of physical resources of the datacenters in the set of selected datacenters to host the respective portions of the requested virtual resources assigned to the datacenters in the set of selected datacenters; and
   determining assignment of the respective portions of the requested virtual resources to the respective sets of physical resources of the datacenters in the set of selected datacenters.

2. The apparatus of claim 1, wherein the virtual resources comprise at least one of virtual machines and virtual storage resources.

3. The apparatus of claim 1, wherein the processor is configured to:
 receive management information associated with the cloud environment, wherein the management information comprises at least one of:
  network management information associated with inter-datacenter communications between the datacenters of the cloud environment; and
  cloud management information comprising, for at least one of the datacenters, management information associated with the datacenter; and
 determine assignment of the requested virtual resources within the cloud environment based on the management information.

4. The apparatus of claim 1, wherein the one or more virtual resource assignment constraints comprises at least one of a maximum amount of virtual resources to be assigned per rack, a minimum number of virtual resources to be assigned per rack, a maximum number of racks to be used per datacenter, a minimum number of racks to be used per datacenter, a maximum amount of virtual resources be assigned per datacenter, a minimum amount of virtual resources to be assigned per datacenter, a maximum number of datacenters to be used, and a minimum number of datacenters to be used.

5. The apparatus of claim 1, wherein determining assignment of the requested virtual resources within the cloud environment comprises at least one of:
- determining the set of selected datacenters to which the virtual resources are to be assigned in a manner tending to reduce path lengths of paths between the datacenters in the set of selected datacenters;
- determining the assignment of the respective portions of the requested virtual resources to the datacenters in the set of selected datacenters in a manner tending to reduce inter-datacenter traffic between the datacenters in the set of selected datacenters;
- selecting the respective sets of physical resources of the datacenters in the set of selected datacenters to host the respective portions of the requested virtual resources to be assigned to the datacenters in a manner tending to reduce intra-datacenter traffic within the respective datacenters in the set of selected datacenters; and
- determining the assignment of the respective portions of the requested virtual resources to the respective sets of physical resources of the datacenters in the set of selected datacenters in a manner tending to reduce intra-datacenter traffic within the respective datacenters in the set of selected datacenters.

6. The apparatus of claim 1, wherein the processor is configured to determine the set of selected datacenters to which the virtual resources are to be assigned by:
- representing the cloud environment as a graph, wherein the graph comprises a plurality of vertices representing the available datacenters and having a plurality of weights associated therewith, wherein the graph comprises a plurality of edges representing a plurality of communication paths between the available datacenters and having a plurality of lengths associated therewith;
- determining a subgraph of the graph having a sum of weights at least equal to the amount of virtual resources requested and a minimum diameter; and
- determining the set of selected datacenters to which the virtual resources are to be assigned based on the subgraph.

7. The apparatus of claim 1, wherein the processor is configured to, for at least one of the virtual resources to be assigned to at least one of the datacenters, determine assignment of the virtual resource to the respective set of physical resources of the datacenter by:
- selecting a rack of the datacenter to which the virtual resource is to be assigned;
- selecting a blade server of the selected rack of the datacenter to which the virtual resource is to be assigned; and
- selecting a central processing unit (CPU) of the selected blade server of the selected rack of the datacenter to which the virtual resource is to be assigned.

8. The apparatus of claim 1, wherein the processor is further configured to:
- initiate provisioning of the virtual resources within the cloud environment based on the determined assignment of the requested virtual resources within the cloud environment.

9. An apparatus, comprising:
a processor and a memory communicatively connected to the processor, the processor configured to:
- receive a request for virtual resources of a cloud environment comprising a set of available datacenters, the available datacenters including respective sets of physical resources available to host virtual resources, wherein the request comprises an amount of virtual resources requested and one or more virtual resource assignment constraints; and
- determine assignment of the requested virtual resources within the cloud environment based on the amount of virtual resources requested and the one or more virtual resource assignment constraints, wherein the processor is configured to determine assignment of the requested virtual resources within the cloud environment by:
  - determining, from the set of available datacenters, a set of selected datacenters to which the requested virtual resources are to be assigned, the set of selected datacenters comprising two or more available datacenters from the set of available datacenters;
  - determining assignment of respective portions of the requested virtual resources to the datacenters in the set of selected datacenters, the requested virtual resources being assigned to two or more selected datacenters from the set of selected datacenters, wherein the processor is configured to determine the assignment of the respective portions of the requested virtual resources to the datacenters in the set of selected datacenters by:
    - representing the request for virtual resources as a graph, wherein the graph comprises a plurality of vertices representing the virtual resources and a plurality of edges connecting pairs of the vertices, wherein an edge connecting a pair of vertices represents a relative bandwidth between the virtual resources represented by the pair of vertices connected by the edge;
    - partitioning the graph into a plurality of partitions to form thereby a partitioned graph, wherein each partition of the partitioned graph represents a respective set of the virtual resources to be scheduled in the same respective datacenter, wherein each partition of the partitioned graph has associated therewith a size that is upper-bounded by an amount of virtual resources available in the respective datacenter; and
    - determining the assignment of the respective portions of the requested virtual resources to the datacenters in the set of selected datacenters based on the partitioned graph;
  - selecting respective sets of physical resources of the datacenters in the set of selected datacenters to host the respective portions of the requested virtual resources assigned to the datacenters in the set of selected datacenters; and
  - determining assignment of the respective portions of the requested virtual resources to the respective sets of physical resources of the datacenters in the set of selected datacenters.

10. The apparatus of claim 9, wherein determining the set of selected datacenters to which the requested virtual resources are to be assigned comprises selecting a subset of the available datacenters that minimizes a maximum distance between any two of the available datacenters subject to one or more constraints.

11. The apparatus of claim 9, wherein the processor is configured to:
- receive management information associated with the cloud environment, wherein the management information comprises at least one of:

network management information associated with inter-datacenter communications between the datacenters of the cloud environment; and cloud management information comprising, for at least one of the datacenters, management information associated with the datacenter; and determine assignment of the requested virtual resources within the cloud environment based on the management information.

12. The apparatus of claim 9, wherein the one or more virtual resource assignment constraints comprises at least one of a maximum amount of virtual resources to be assigned per rack, a minimum number of virtual resources to be assigned per rack, a maximum number of racks to be used per datacenter, a minimum number of racks to be used per datacenter, a maximum amount of virtual resources be assigned per datacenter, a minimum amount of virtual resources to be assigned per datacenter, a maximum number of datacenters to be used, and a minimum number of datacenters to be used.

13. The apparatus of claim 9, wherein determining assignment of the requested virtual resources within the cloud environment comprises at least one of:

determining the set of selected datacenters to which the virtual resources are to be assigned in a manner tending to reduce path lengths of paths between the datacenters in the set of selected datacenters;

determining the assignment of the respective portions of the requested virtual resources to the datacenters in the set of selected datacenters in a manner tending to reduce inter-datacenter traffic between the datacenters in the set of selected datacenters;

selecting the respective sets of physical resources of the datacenters in the set of selected datacenters to host the respective portions of the requested virtual resources to be assigned to the datacenters in a manner tending to reduce intra-datacenter traffic within the respective datacenters in the set of selected datacenters; and determining the assignment of the respective portions of the requested virtual resources to the respective sets of physical resources of the datacenters in the set of selected datacenters in a manner tending to reduce intra-datacenter traffic within the respective datacenters in the set of selected datacenters.

14. The apparatus of claim 9, wherein the processor is configured to, for at least one of the virtual resources to be assigned to at least one of the datacenters, determine assignment of the virtual resource to the respective set of physical resources of the datacenter by:

selecting a rack of the datacenter to which the virtual resource is to be assigned;

selecting a blade server of the selected rack of the datacenter to which the virtual resource is to be assigned; and selecting a central processing unit (CPU) of the selected blade server of the selected rack of the datacenter to which the virtual resource is to be assigned.

15. An apparatus, comprising:

a processor and a memory communicatively connected to the processor, the processor configured to:

receive a request for virtual resources of a cloud environment comprising a set of available datacenters, the available datacenters including respective sets of physical resources available to host virtual resources, wherein the request comprises an amount of virtual resources requested and one or more virtual resource assignment constraints; and determine assignment of the requested virtual resources within the cloud environment based on the amount of virtual resources requested and the one or more virtual resource assignment constraints, wherein the processor is configured to determine assignment of the requested virtual resources within the cloud environment by:

determining, from the set of available datacenters, a set of selected datacenters to which the requested virtual resources are to be assigned, the set of selected datacenters comprising two or more available datacenters from the set of available datacenters;

determining assignment of respective portions of the requested virtual resources to the datacenters in the set of selected datacenters, the requested virtual resources being assigned to two or more selected datacenters from the set of selected datacenters;

selecting respective sets of physical resources of the datacenters in the set of selected datacenters to host the respective portions of the requested virtual resources assigned to the datacenters in the set of selected datacenters, wherein the processor is configured to, for at least one of the datacenters in the set of selected datacenters, select the respective set of physical resources of the datacenter to host the respective portion of the requested virtual resources to be assigned to the datacenter by:

representing the datacenter as a tree topology, wherein the tree topology comprises a plurality of nodes representing resources of the datacenter, wherein each of the nodes of the tree topology has associated therewith a weight representing an amount of virtual resources rooted at the node, wherein each of the nodes of the tree topology has associated therewith a height representing a height of the node within the tree topology, wherein the plurality of nodes comprises a plurality of leaf nodes representing a respective plurality of racks, blade servers, or processors of the datacenter;

determining a subtree of the tree topology whose leaf nodes have a cumulative weight at least equal to the amount of virtual resources to be assigned to the datacenter and a minimum height; and selecting the set of physical resources of the datacenter to host the respective portion of the requested virtual resources to be assigned to the datacenter based on the subtree; and determining assignment of the respective portions of the requested virtual resources to the respective sets of physical resources of the datacenters in the set of selected datacenters.

16. The apparatus of claim 15, wherein determining the set of selected datacenters to which the requested virtual resources are to be assigned comprises selecting a subset of the available datacenters that minimizes a maximum distance between any two of the available datacenters subject to one or more constraints.

17. The apparatus of claim 15, wherein the processor is configured to:

receive management information associated with the cloud environment, wherein the management information comprises at least one of:

network management information associated with inter-datacenter communications between the datacenters of the cloud environment; and cloud management information comprising, for at least one of the datacenters, management information associated with the datacenter; and determine assignment of the requested virtual resources within the cloud environment based on the management information.

18. The apparatus of claim 15, wherein the one or more virtual resource assignment constraints comprises at least one of a maximum amount of virtual resources to be assigned per rack, a minimum number of virtual resources to be assigned per rack, a maximum number of racks to be used per datacenter, a minimum number of racks to be used per datacenter, a maximum amount of virtual resources be assigned per datacenter, a minimum amount of virtual resources to be assigned per datacenter, a maximum number of datacenters to be used, and a minimum number of datacenters to be used.

19. The apparatus of claim 15, wherein determining assignment of the requested virtual resources within the cloud environment comprises at least one of:

determining the set of selected datacenters to which the virtual resources are to be assigned in a manner tending to reduce path lengths of paths between the datacenters in the set of selected datacenters;

determining the assignment of the respective portions of the requested virtual resources to the datacenters in the set of selected datacenters in a manner tending to reduce inter-datacenter traffic between the datacenters in the set of selected datacenters;

selecting the respective sets of physical resources of the datacenters in the set of selected datacenters to host the respective portions of the requested virtual resources to be assigned to the datacenters in a manner tending to reduce intra-datacenter traffic within the respective datacenters in the set of selected datacenters; and determining the assignment of the respective portions of the requested virtual resources to the respective sets of physical resources of the datacenters in the set of selected datacenters in a manner tending to reduce intra-datacenter traffic within the respective datacenters in the set of selected datacenters.

20. The apparatus of claim 15, wherein the processor is configured to, for at least one of the virtual resources to be assigned to at least one of the datacenters, determine assignment of the virtual resource to the respective set of physical resources of the datacenter by:

selecting a rack of the datacenter to which the virtual resource is to be assigned;

selecting a blade server of the selected rack of the datacenter to which the virtual resource is to be assigned; and selecting a central processing unit (CPU) of the selected blade server of the selected rack of the datacenter to which the virtual resource is to be assigned.

* * * * *